March 29, 1932. C. H. STAPF 1,851,529
FISH LURE
Filed Oct. 10, 1929
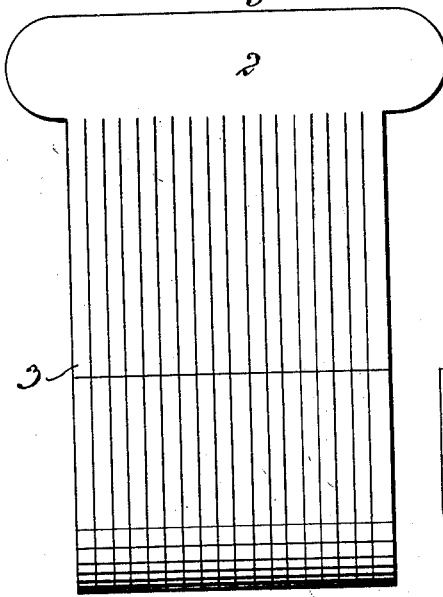
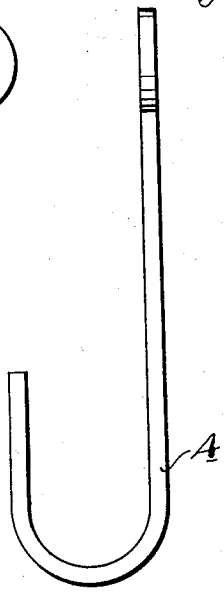
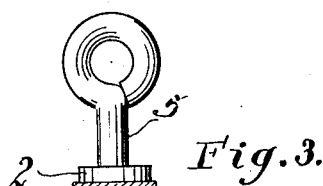
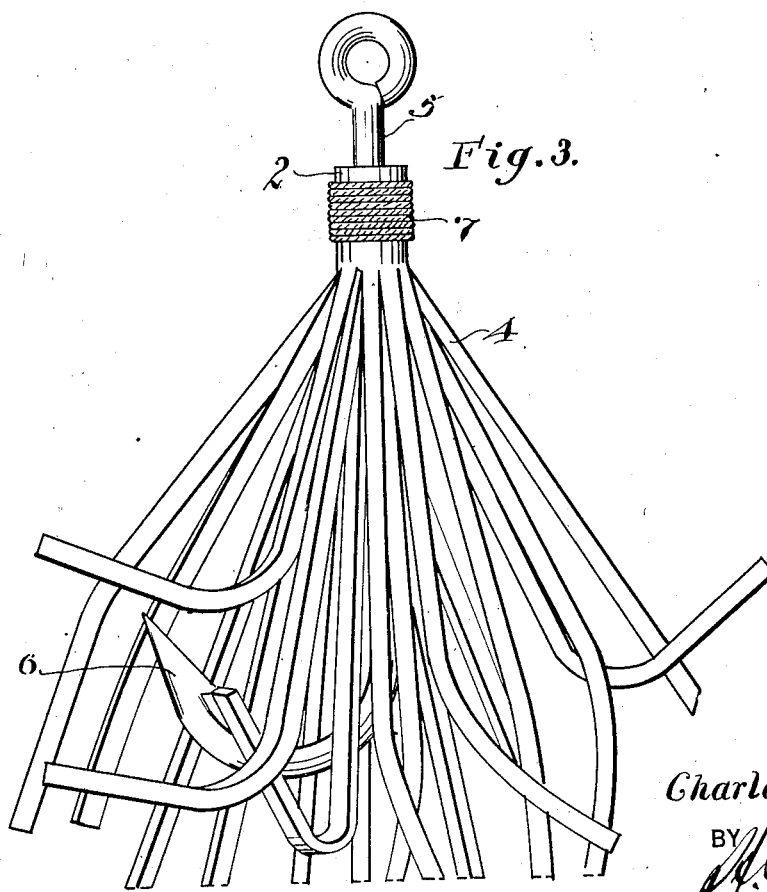
INVENTOR
Charles H. Stapf
BY
ATTORNEY Patented Mar. 29, 1932

1,851,529

UNITED STATES PATENT OFFICE

CHARLES H. STAPF, OF PRESCOTT, WISCONSIN

FISH LURE

Application filed October 10, 1929. Serial No. 398,653.

My invention relates to improvements in fish lures.

One of the objects of my invention is to provide a fish lure so constructed as to simulate the appearance and activity of a bunch of live angle worms in connection with a hook.

Another object of my invention is to provide means of this character than can be sold as an independent article and be easily and quickly secured in connection with the hook by the fisherman, and, which, when being used and drawn through the water, will give the appearance of a bunch of angle worms actively squirming in connection with the hook.

These and other features of the invention will be more specifically set forth in the following description and the accompanying drawings, wherein:

Figure 1 is a plan view of a preferred form of my invention.

Figure 2 is a view in side elevation; and

Figure 3 is a view in side elevation of my invention arranged in connection with a hook.

Referring to the drawings in detail, Figure 1 shows a sheet of rubber cut to form a tab end 2 and a plurality of strips 3 projecting from the tab. The strips 3 are bent at their free ends 4, as shown in Figure 2. In use, the tab end 2 is wrapped around the shank 5 of the hook 6 and secured as by a cord 7. When thus arranged in connection with the hook, the bent strips 3 will stand in separated position, and, with their ends at varying angles, as shown in Figure 3. When the hook with my supported lure is pulled through the water in fishing, the elasticity of the strips 3, in cooperation with the bent ends of the strips, results in the strips stretching and contracting, and the bent ends straightening and returning from straightened to bent position. This constant movement and stretching of the rubber strips very closely simulates the active squirming of worms.

I have found this lure to be particularly attractive for that type of fish as wall-eyed pike, etc., that are normally attracted by worms.

In the use of live worms, in addition to the fact that live worms are so seldom properly arranged in connection with the hook, there is the constant losing of the worms and other objections known to all fishermen in connection with the use of live worms. I secure the further advantage of using different colors of rubber to meet varying conditions. I am convinced by experience that the elasticity of the bands and the bending of them is of prime importance in securing the results I have secured, as I have found by experience in actual use of my lure that fish are to a much greater extent attracted by the lure than by live worms, and that they strike better and are more easily and effectively hooked.

I claim:

In combination with a fish hook having a hook portion and a shank portion, a plurality of resilient rubber strips secured to the shank of said hook and extending toward said hook portion, the unsecured ends of said strips being normally curved back upon themselves to cause a squirming motion thereof when moved in water.

In testimony whereof I affix my signature.

CHARLES H. STAPF.